US006443473B1

United States Patent
Lentz

(10) Patent No.: US 6,443,473 B1
(45) Date of Patent: Sep. 3, 2002

(54) PORTABLE AUDIO ENTERTAINMENT APPARATUS CONTAINING SEPARATELY CARRIED SIGNAL AND SOUND PRODUCING PORTIONS

(76) Inventor: Cathy J. Lentz, 164 W. Mariposa, San Clemente, CA (US) 92672

( * ) Notice: Subject to any disclaimer, the term of this patent is extended or adjusted under 35 U.S.C. 154(b) by 0 days.

(21) Appl. No.: 09/104,763

(22) Filed: Jun. 25, 1998

(51) Int. Cl.[7] .............................................. B62J 39/00
(52) U.S. Cl. ..................... 280/288.4; 455/350; 455/351
(58) Field of Search ............................. 280/288.4, 346, 280/350; 455/344, 351

(56) References Cited

U.S. PATENT DOCUMENTS

| | | | | |
|---|---|---|---|---|
| 4,500,019 A | * | 2/1985 | Curley, Jr. ................ 224/222 |
| 4,756,454 A | * | 7/1988 | Villanueva et al. ........... 224/30 |
| 4,811,314 A | * | 3/1989 | Alves ......................... 369/10 |
| 4,856,364 A | * | 8/1989 | Dixon ..................... 280/288.4 |
| 4,868,888 A | * | 9/1989 | Dayton ........................ 455/90 |
| 4,981,243 A | * | 1/1991 | Rogowski ..................... 224/41 |
| 5,001,779 A | * | 3/1991 | Eggert et al. ............... 455/346 |
| 5,426,570 A | * | 6/1995 | Davis ........................ 362/72 |
| 5,465,421 A | * | 11/1995 | McCormick et al. ........ 455/344 |
| 5,651,485 A | * | 7/1997 | Impastato, II ............... 224/460 |
| 5,823,557 A | * | 10/1998 | Penza ...................... 280/288.4 |
| 6,015,160 A | * | 1/2000 | Spector ................... 280/288.4 |

* cited by examiner

*Primary Examiner*—Robert P. Olszewski
*Assistant Examiner*—James S. McClellan
(74) *Attorney, Agent, or Firm*—Robert D. Fish; Rutan & Tucker, LLP

(57) ABSTRACT

An audio entertainment system has a signal producing portion which is worn on the person and an associated sound producing portion which is carried on a vehicle. Where the vehicle comprises a bicycle, the sound producing portion may advantageously comprise a combination of speaker and power supply on the frame of the bicycle. In especially preferred bicycle embodiments the sound producing portion is removably carried by a bracket sized and dimensioned to carry a water bottle. The signal producing portion may advantageously comprise at least one of a radio tuner, a CD player and a tape player.

8 Claims, 1 Drawing Sheet

PORTABLE AUDIO ENTERTAINMENT APPARATUS CONTAINING SEPARATELY CARRIED SIGNAL AND SOUND PRODUCING PORTIONS

FIELD OF INVENTION

The field of the invention is transportation vehicles.

BACKGROUND OF THE INVENTION

Portable radios, tape players, and CD players are commonplace electronic devices for providing entertainment. While there are literally hundreds or even thousands of commercial embodiments of such devices on the market, it is possible to characterize the entire class as comprising two portions, (1) a signal producing portion and (2) a sound producing portion. To clarify the distinction as used herein, the signal producing portion of a radio would be the tuner portion which receives a radio signal, while the sound producing portion of the radio would be the speaker or speakers. To further clarify, the signal producing portion of a CD player would be the CD turntable and associated electronics, while the sound producing portion would again be some sort of speaker or speakers. Those skilled in the art will recognize that this same distinction is frequently made in fixed location entertainment systems, where the speakers may measure several feet in one or more dimensions.

When considering the use of sound producing devices in conjunction with transportation vehicles, there are conceptually only four possible permutations of signal producing component and sound producing component. In one permutation, both signal producer and sound producer are carried on a person during use. This would occur when the driver or other person traveling in or on a vehicle is using a completely portable device such as a Walkman™ type hand-held radio. In another permutation, both signal producer and sound producer are carried on the vehicle during operation. This category includes virtually all common automobile and motorcycle radios. The boundary between these two groupings of products is generally fairly distinct, but may at times be somewhat blurred. For example, it is known to removably attach a hand-held radio to a vehicle such as a bicycle using brackets as described in U.S. Pat. No. 3,598,295 to Seegers (August 1971).

A third permutation combines carrying the signal producer on a vehicle, and carrying the sound producer on the person. Examples here include an automotive type radio that includes headphones, or a Seegers type apparatus used with headphones. In general, the idea is to use the vehicle to carry the relatively sophisticated, heavy, and possibly motion sensitive signal producing portion, while the person is used to carry the relatively simple, lightweight, and rugged sound producing headphones or earpiece. This category of products is also advantageous in that the vehicle is generally better adapted to carrying the power supply than a person. This category of products is also advantageous in that use of headphones protects others from having to listen in on the music or other sounds being played.

The fourth permutation combines carrying the signal producer on a person, but carrying the sound producer on a vehicle. To our knowledge, embodiments in this category are entirely unknown for entertainment devices, possibly because they would preclude all of the various advantages listed above.

The present inventors, however, have recognized that there are several applications in which embodiments of this last category are desirable. One such application involves bicycling, and especially when traveling relatively long routes. In such situations a bicyclist may find it awkward, uncomfortable or even hazardous to wear headphones, and may therefore desire to mount the sound producing portion on the bicycle. A group of bicyclists may even find it enjoyable to all listen to a broadcast or song emanating from a common speaker. At the same time, the bicyclist may find it advantageous to wear the signal producing portion on his or her person, thereby preventing theft, and possibly facilitating switching to headphones when leaving the bicycle.

Thus, there, is still a need to provide systems and methods for operating an audio system in conjunction with a vehicle.

SUMMARY OF THE INVENTION

The present invention is directed to methods and apparatus in which a person operates an audio entertainment system in conjunction with a vehicle, wherein the audio system has a signal producing portion which is worn on the person and an associated sound producing portion which is carried on the vehicle.

Where the vehicle comprises a bicycle, the sound producing portion may advantageously comprise a combination of speaker and power supply on the frame of the bicycle. In especially preferred bicycle embodiments the sound producing portion is removably carried by a bracket sized and dimensioned to carry a water bottle. The signal producing portion may advantageously comprise at least one of a radio tuner, a CD player and a tape player.

Various objects, features, aspects and advantages of the present invention will become more apparent from the following detailed description of preferred embodiments of the invention, along With the accompanying drawings in which like numerals represent like portions.

DETAILED DESCRIPTION

Figure 1:
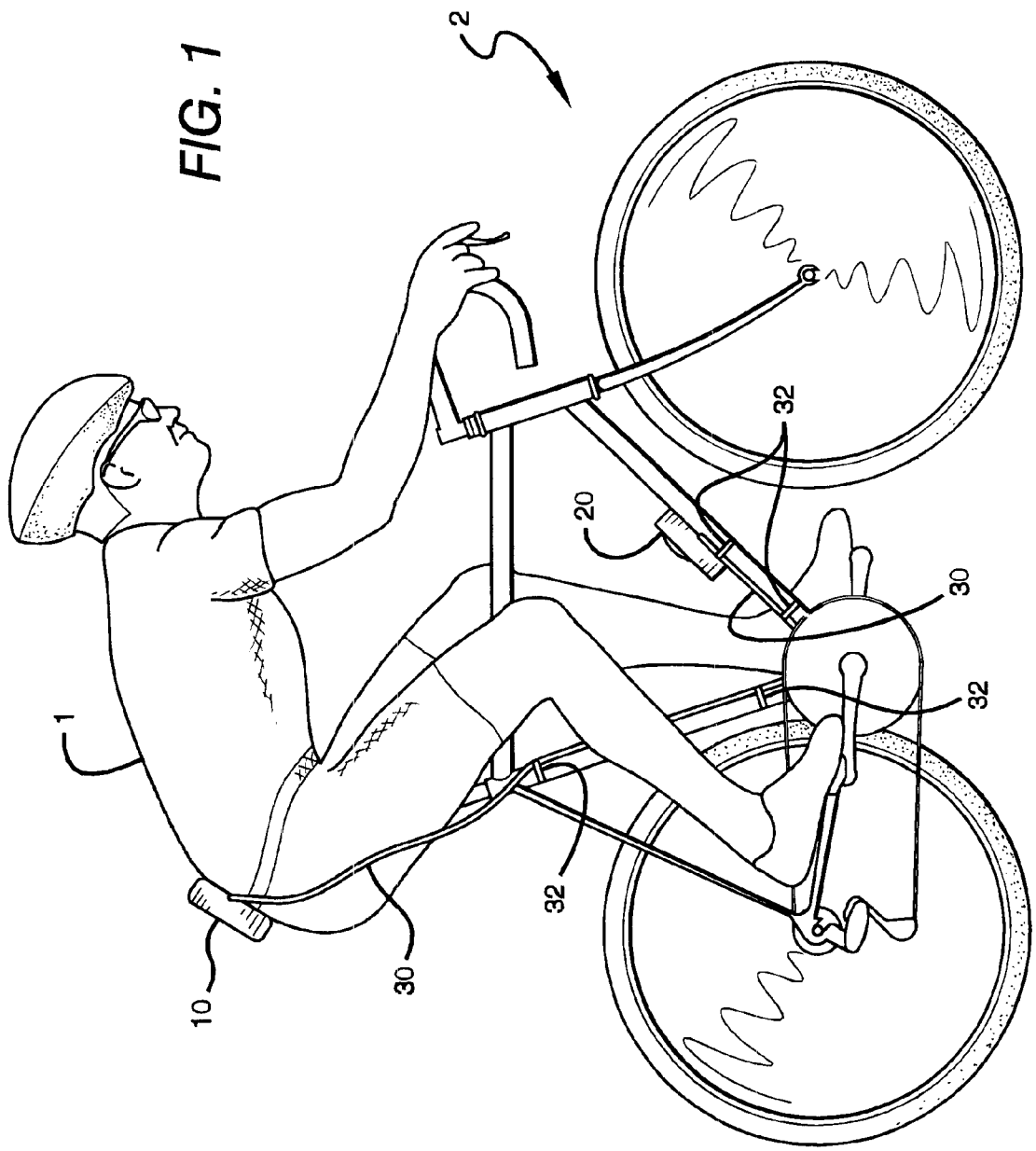
FIG. 1 is a bicycle and rider employing a device according to the present invention.

In FIG. 1 a person 1 operating a bicycle 2 cooperate to carry portions of an audio entertainment system—the person 1 wears a signal producing portion 10 and the bicycle 2 carries a sound producing portion 20. A pair of wires 30 electrically couples the signal producing portion 10 the sound producing portion 20.

Considering FIG. 1 in greater detail, the person 1 is generally contemplated to be the operator of the bicycle 2 or other type of vehicle (not shown), although in other embodiments the person carrying the signal producing portion 10 may be a passenger. It is also contemplated that the person 1 will actually wear the signal producing portion 10 during operation of the vehicle rather than, for example, just carry it in his or her hand. In preferred embodiments the person 1 wears the signal producing portion 10 in a manner appropriate for operating the particular type of vehicle. Thus, where the vehicle is a bicycle as shown, the signal producing portion 10 may advantageously be worn on the waist, possibly in conjunction with a belt attachment. Under such circumstances it is also preferred to wear the signal producing portion 10 in a backpack, or slung over one of the shoulders using a carrying strap. Alternatively, the signal producing portion 10 may be attached to an arm or leg.

In general the term "wearing" includes any means by which the signal producing portion 10 is carried on a person other than being held in the hands. Thus, it is contemplated that appropriately sized and shaped signal producing portions can be worn on the arm, wrist, leg or torso using a simple band, or may be worn in a pocket or pouch. The term also includes situations in which a person carries the signal producing portion during a portion of time, but places it on the vehicle during another portion of time. For example, it is specifically contemplated that a person may ride a bicycle while carrying the sound producing portion on a belt for a period of time, and then switch to carrying the sound producing portion on a belt, sling, bracket or other carrier under the seat or on the seat post for another period of time.

Bicycle 2 depicted is properly viewed in a very broad, generic sense. There are no particular limitations intended as to the make, size or other characteristics of bicycle 2, and it is particularly contemplated that different embodiments of bicycle 2 would include common road bikes, touring bikes, mountain bikes, bicycles for any age group from children through adults, and bicycles for any skill level from novices to professionals. In still other embodiments (not shown) the bicycle 2 can be replaced with any other type of transportation vehicle. Thus, the term "vehicle" as used herein includes all manner of vehicles regardless of whether the vehicle is motorized or non-motorized, regardless of the manner of propulsion, whether by wheels, propeller and so forth, regardless of the presence or absence of a passenger cab, etc. Among other things, the term vehicle includes bicycles, motorcycles, automobiles, baby carriages, and baby runners.

Signal producing portion 10 can comprise any device which produces an entertainment signal. As used herein the term "entertainment signal" is a signal which can be transformed into sensible (perceptible) sounds to provide entertainment. Examples of devices which fall within the category of producing an entertainment signal are radio tuners, CD tables, tape players, game players and computers. It is also contemplated that such devices may have multiple functions, such as a composite radio/CD player. Devices which would generally not be considered as falling within this category are walkie-talkies, and police radios. It will also be appreciated that embodiments of signal producing portion 10 will often join with one or more speakers within a single housing, but in general such speakers would be disengaged while the signal is used to drive sound producing portion 20.

The sound producing portion 20 will usually comprise one or more speakers. Such speakers may be fixedly mounted in or on the vehicle (not shown), or may be hand-removably mounted in or on the vehicle as shown in FIG. 1. In that embodiment, at least one speaker is included in a housing with a power supply, and the housing is sized and dimensioned to be received by a standard water bottle holder. Such holders are well known in the bicycling field, and are shipped as standard equipment on many new bicycles. As used herein, the term "hand-removably mounted" means that some or all of the housing can be removed from the water bottle holder or other receiver with minimal effort, either using a simple tool such as a screwdriver or without the use of any tools at all.

Appropriate speakers are also well known. In some embodiments, such as where the speakers are likely to be subjected to rain, snow, or other undesirable weather elements, such speakers are preferably designed for outdoor use. In addition, contemplated speakers may include a directionalizing member for directing the sound towards or away from the driver, or for radiating out such sound across a wide area. In other aspects, the sound producing portion may comprise a plurality of speakers, some of which may be more responsive to particular frequencies than others.

Since speakers tend to draw a relatively large amount of power, a housing containing the sound producing portion 20 will may advantageously include a power source such as a battery or battery pack, a capacitor, or a generator. Any of the commercially available batteries may be suitable for this purpose, including AA, C and D cell batteries, in addition to larger sizes. Such batteries may also be rechargeable. It is specifically contemplated that the power supply of the sound producing portion 20 can be the same as, or separate from, a power supply used to operate the signal producing portion 10.

The housing of sound producing portion 20 will preferably include some sort of switching arrangement. Contemplated options here include a simple on/off switch, as well as more sophisticated controls such as volume controls, and circuits which alter the volume depending on ambient noise or other conditions. Thus, it is contemplated that the volume of sound produced by the sound producing portion 20 may automatically increase from a pre-set volume level when surrounding noise is high, and may automatically decrease from a pre-set volume level when the surrounding noise is low.

The pair of wires 30, electrically coupling the signal producing portion 10 the sound producing portion 20, are contemplated to be ordinary wire, such as that which might be used to drive speakers in a home audio system. There are, of course, many paths which the wires 30 may take, including a preferred path shown in FIG. 1 in which the wires 30 are held tight against the frame using brackets 32. Alternatively, the wires 30 could be replaced completely or in part by some other means of transmission, such as an infrared signal similar to that used on television set remote control devices, or those used to transmit information between nearby computers. The wires 30 could even be replaced by a low power radio wave. Still further, the single pair of wires 30 shown in FIG. 1 could be augmented by an additional pair of wires which lead to a device other than signal producing portion 20.

Thus, specific embodiments and applications of portable audio entertainment apparatus containing separately carried signal and sound producing portions have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A method of operating a vehicle, comprising:
   providing an audio system having a signal producing portion and a sound producing portion, wherein the signal producing portion is selected from the group consisting of a radio tuner, a CD player, a tape player, a game player, and a computer;
   carrying the sound producing portion on the vehicle, wherein the vehicle is selected from the group consisting of a bicycle, a motorcycle, a motor vehicle, a baby carriage, and a baby runner;
   wearing the signal producing portion on a person; and
   coupling the signal producing portion to drive the sound producing portion while the sound producing portion is being worn on the person.

2. The method of claim 1 wherein the sound producing portion comprises a speaker.

3. The method of claim 1 wherein the sound producing portion comprises a speaker which delivers a sensible output, and further comprising automatically adjusting the output to compensate for ambient noise.

4. A method of operating a vehicle, comprising:

providing an audio system having a signal producing portion and a sound producing portion;

carrying the sound producing portion on the vehicle, wherein the vehicle is bicycle and the sound producing portion is carried by a bracket and the bracket sized and dimensioned to carry a water bottle;

wearing the signal producing portion on a person; and coupling the signal producing portion to drive the sound producing portion while the sound producing portion is being worn on the person.

5. The method of claim 4 further comprising providing separate power supplies for the signal producing portion and the sound producing portion.

6. The method of claim 4 wherein the signal producing component comprises a radio tuner.

7. The method of claim 4 wherein the signal producing component comprises a CD player.

8. The method of claim 4 wherein the signal producing component comprises a tape player.

* * * * *

UNITED STATES PATENT AND TRADEMARK OFFICE
CERTIFICATE OF CORRECTION

PATENT NO.    : 6,443,473 B1
DATED         : September 3, 2002
INVENTOR(S)   : Cathy Lentz It is certified that error appears in the above-identified patent and that said Letters Patent is hereby corrected as shown below:

<u>Column 4,</u>
Line 60, replace "sound" with -- signal --.

<u>Column 5,</u>
Line 10, replace "sound" with -- signal --.

Signed and Sealed this

Fourth Day of March, 2003

*Attest:*

*Attesting Officer*

JAMES E. ROGAN
*Director of the United States Patent and Trademark Office*